Nov. 16, 1948.    F. S. SMITH    2,453,818
METHOD AND APPARATUS FOR DESTROYING INSECT LIFE
Filed Oct. 27, 1943    5 Sheets-Sheet 1
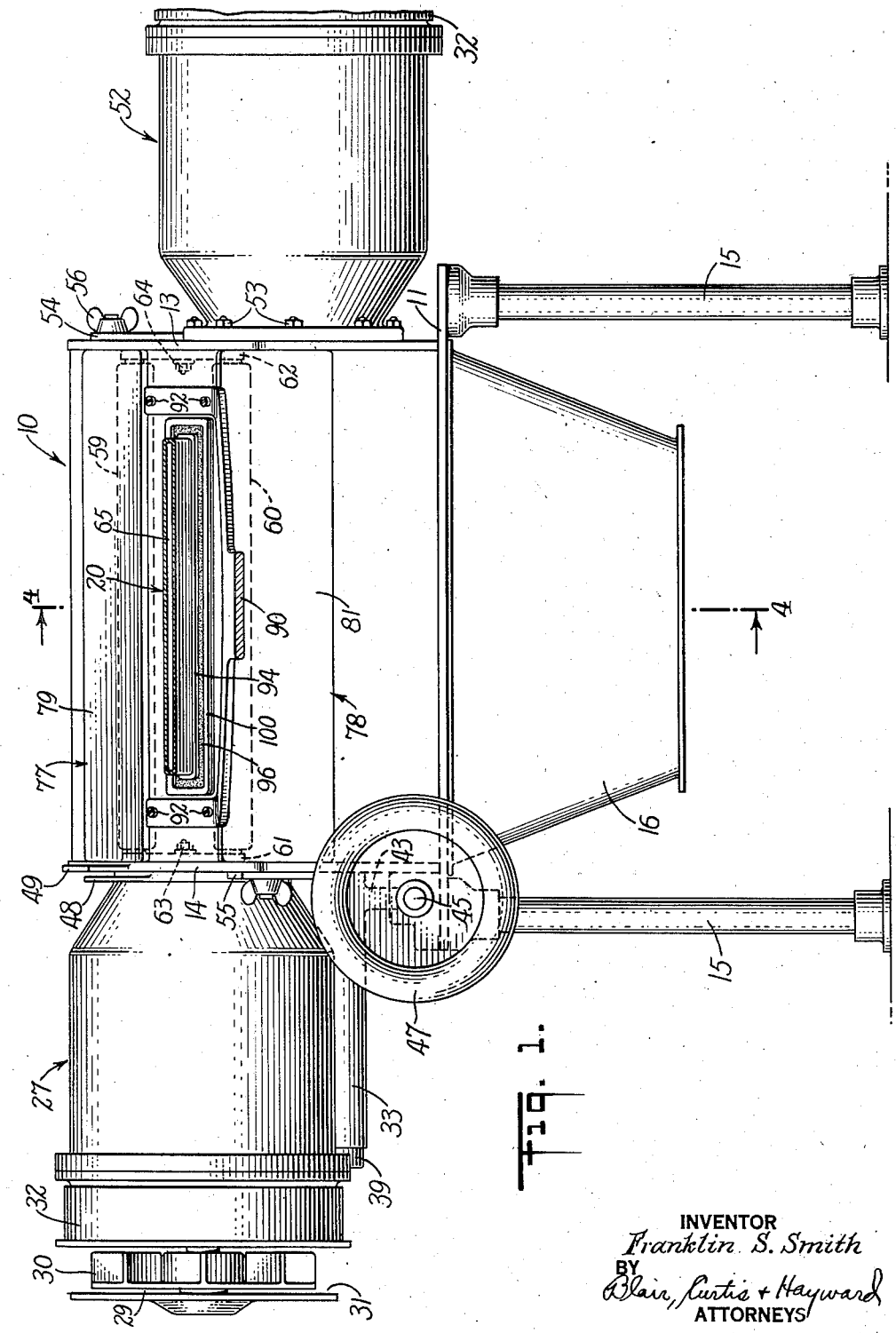
INVENTOR
Franklin S. Smith
BY
Blair, Curtis + Hayward
ATTORNEYS Nov. 16, 1948.  F. S. SMITH  2,453,818
METHOD AND APPARATUS FOR DESTROYING INSECT LIFE
Filed Oct. 27, 1943  5 Sheets-Sheet 2
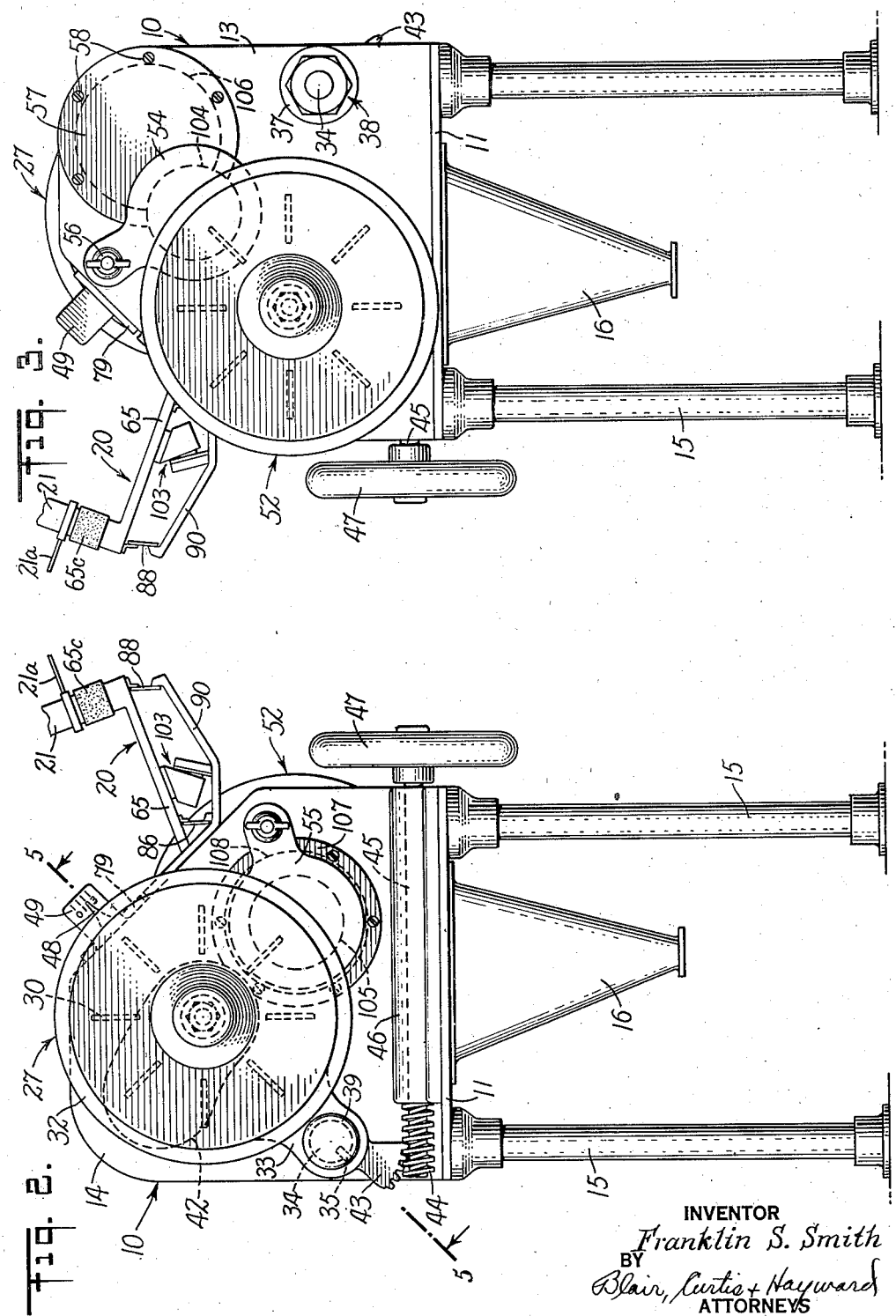
INVENTOR
*Franklin S. Smith*
BY
*Blair, Curtis + Hayward*
ATTORNEYS Nov. 16, 1948.   F. S. SMITH   2,453,818
METHOD AND APPARATUS FOR DESTROYING INSECT LIFE
Filed Oct. 27, 1943   5 Sheets-Sheet 3
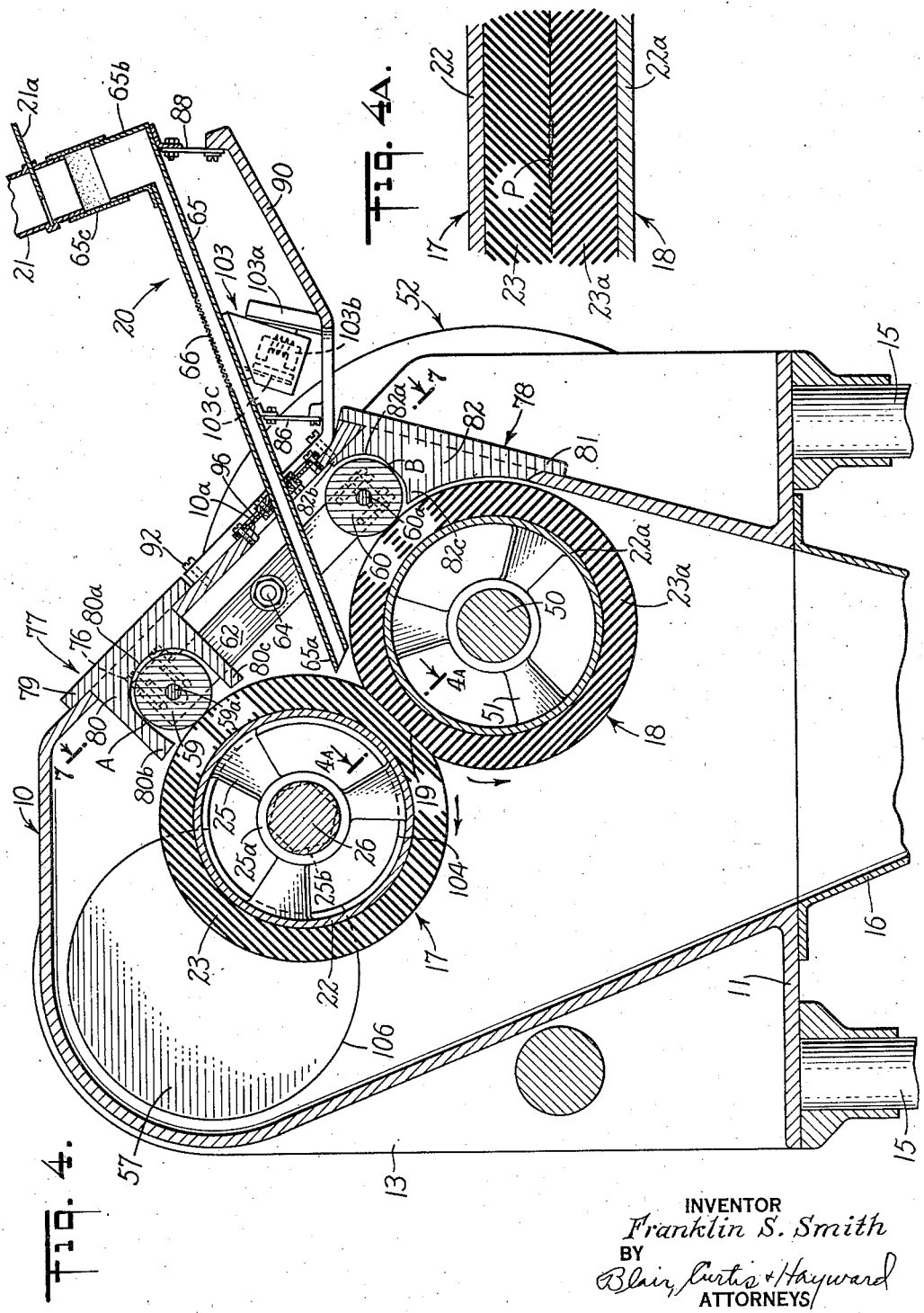
INVENTOR
Franklin S. Smith
BY
Blair, Curtis & Hayward
ATTORNEYS

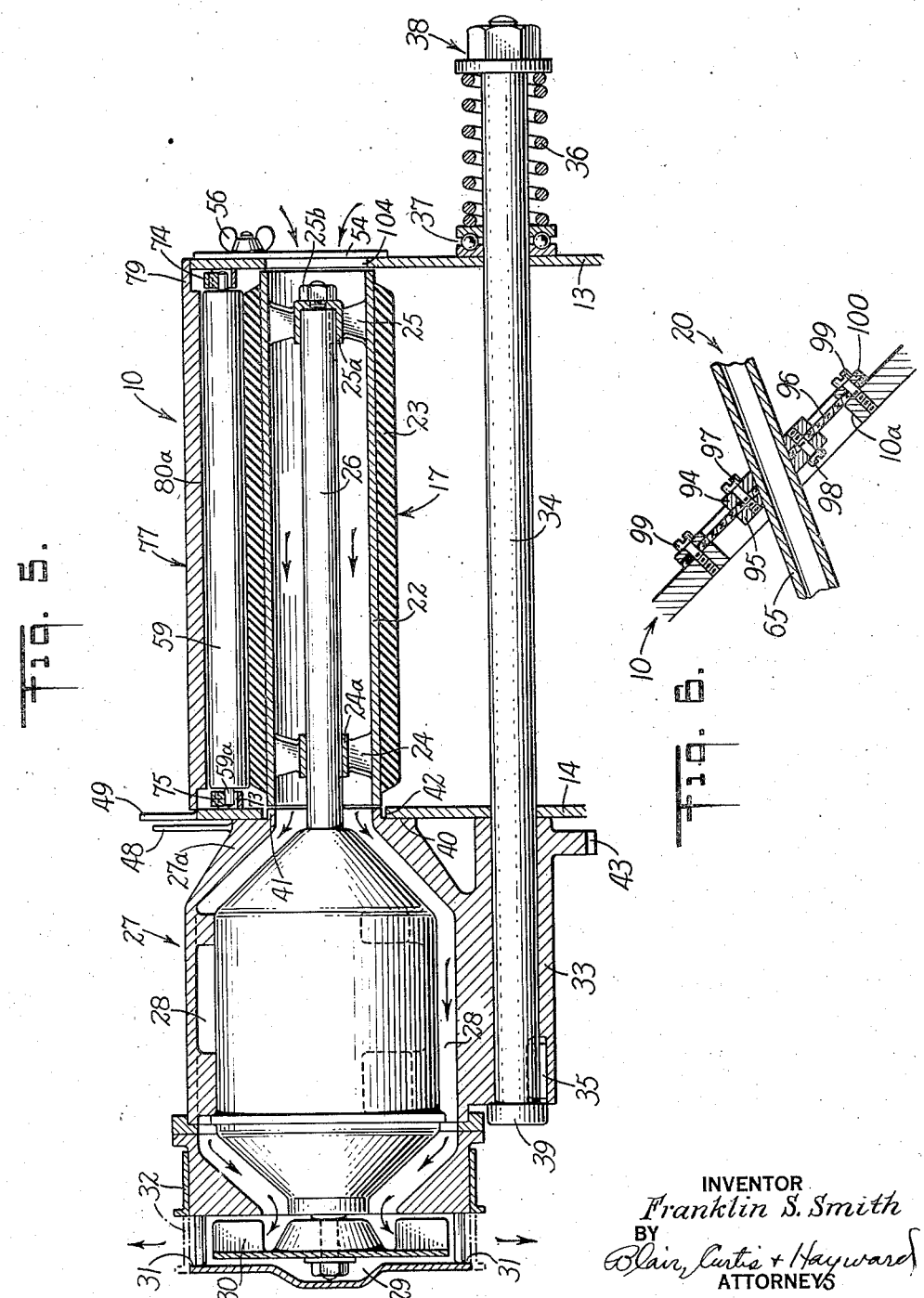

Nov. 16, 1948.  F. S. SMITH  2,453,818
METHOD AND APPARATUS FOR DESTROYING INSECT LIFE
Filed Oct. 27, 1943  5 Sheets-Sheet 5
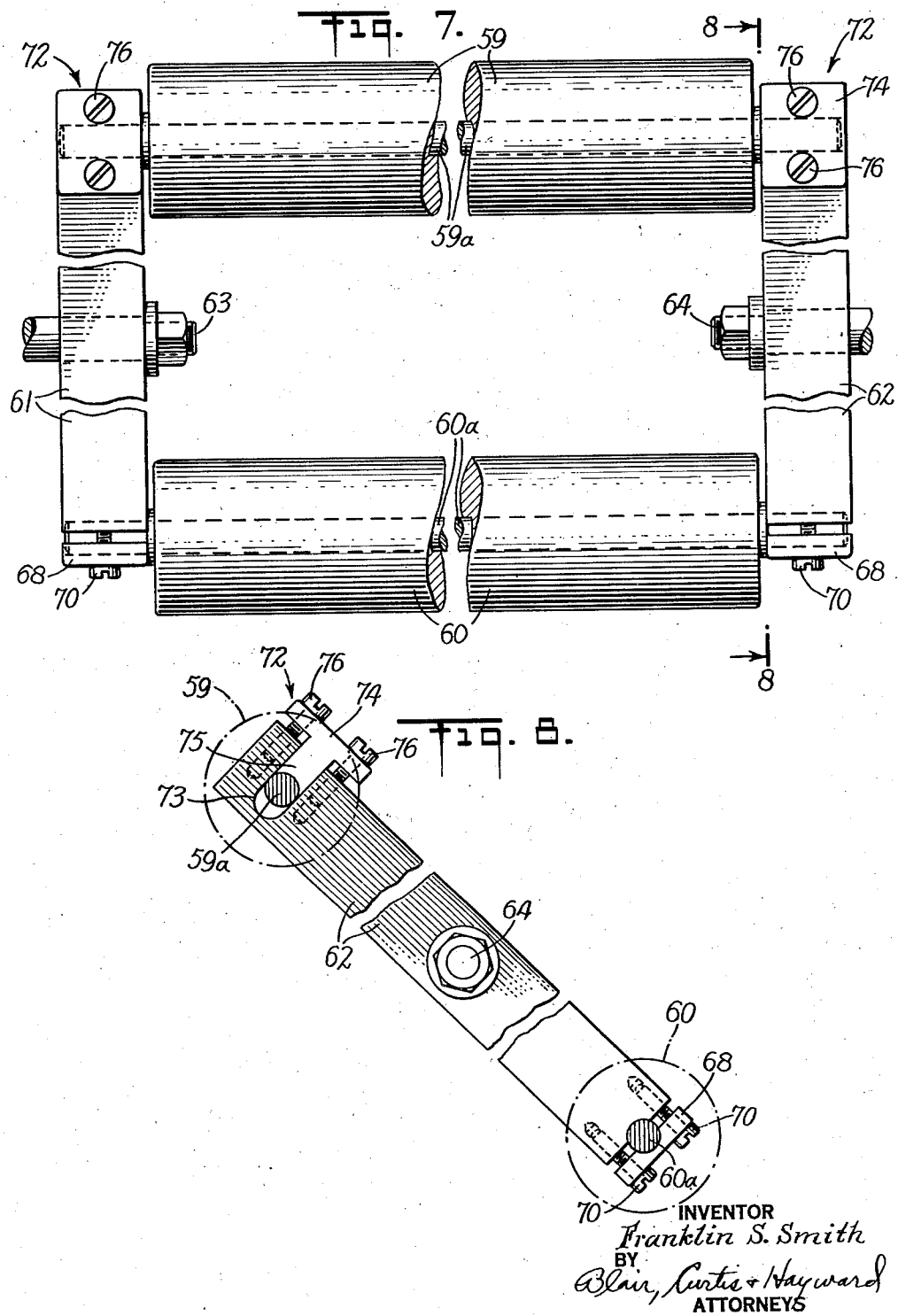

Patented Nov. 16, 1948

2,453,818

UNITED STATES PATENT OFFICE 2,453,818

METHOD AND APPARATUS FOR DESTROYING INSECT LIFE

Franklin S. Smith, North Haven, Conn.

Application October 27, 1943, Serial No. 507,772

13 Claims. (Cl. 21—2)

This invention relates to apparatus for destroying insect life in a flowable product.

One of the objects of this invention is to provide apparatus for destroying all forms of insect life in a flowable product which is simple and relatively inexpensive in construction, while thoroughly dependable, sturdy and durable over extended periods of operation. Another object is to provide apparatus of the above nature capable of efficiently treating a substantial amount of product per unit of time. Another object is to provide apparatus of the above nature which can be readily installed to treat a stream of a product in a mill, for example, and the operating parts of which are readily accessible for cleaning, repair or replacement. Another object of my invention is to provide for completely destroying all forms of insect life in a flowable product in a manner which is thoroughly dependable and efficient and which makes possible the treating of large quantities of product in a given unit of time. Another object is to provide for the carrying out of the above in a manner which may readily be practiced without the necessity of constant and skilled attention. Other objects will be in part apparent and in part pointed out hereinafter.

The invention accordingly consists in the features of construction, combinations of elements, and arrangements of parts as will be exemplified in the structure to be hereinafter described, and the scope of the application of which will be indicated in the following claims.

In the drawing, wherein I have shown one form of my invention,

Figure 1 is a front view, partially in section, showing the inlet end of my apparatus;

Figure 2 is an elevation of the left-hand end of my apparatus as viewed in Figure 1;

Figure 3 is an elevation of the right-hand side of my apparatus, as viewed in Figure 1;

Figure 4 is an enlarged fragmentary sectional elevation, taken along the line 4—4 of Figure 1;

Figure 4A is an enlarged fragmentary sectional view taken along the line 4A—4A of Figure 4;

Figure 5 is a sectional view taken along the line 5—5 of Figure 2;

Figure 6 is an enlarged fragmentary sectional view of the flexible connection between the inlet feeder chute and the casing;

Figure 7 is an enlarged fragmentary section taken along the line 7—7 of Figure 4 but omitting the casing and shield structures and the feeding chute; and, Figure 8 is a sectional view taken along the line 8—8 of Figure 7.

Similar reference characters refer to similar parts throughout the various views of the drawing.

In my copending applications, Serial No. 296,543, filed September 26, 1939, and Serial No. 345,715, filed July 16, 1940 (which issued on January 18, 1944 as Patents Numbers 2,339,654 and 2,339,733, respectively), I have disclosed product treating machines particularly well adapted to completely destroy all forms of insect life in milled products, wherein the individual particles of the product are relatively minute or are of such a character that violent impacting, squeezing or abrasion thereof during the treatment period does not harm or appreciably deteriorate the product. Certain products, such as, for example, various flaked cereals and pipe and cigarette tobaccos, all of which may be infested to a greater or less degree, comprise individual particles which do not flow through the squeezer type of machine, and which are subject to excessive disintegration in the impactor type of machine. It is accordingly a difficult problem to destroy completely the infestation in such products by physically mutilating the insect life from egg to adult, without damaging the individual particles of the product. Additional problems are encountered in mechanically treating sufficiently large amounts of such products per unit of time economically, while at the same time effecting total destruction of the various forms or stages of the infestation. The necessity of this total destruction is evident and is discussed in my copending applications noted above.

Still further problems of treating capacity, accessibility for cleaning and repair, general cleanliness and freedom from dust are encountered where the apparatus is to be used in a mill stream or otherwise where the flow of the product is continuous and should not be interrupted. It is accordingly another object of my invention to provide apparatus and a method of the character hereinbefore referred to, capable of solving these problems in an efficient manner.

Referring now to Figure 1, my machine comprises a housing generally indicated at 10 which, as is better shown in Figure 4, includes a base plate 11, and side plates 13 and 14 (Figure 1). Base plate 11 is mounted on a suitable number of supporting legs 15, and has attached thereto in any suitable manner an outlet chute 16, the upper end of which communicates with the outlet of housing 10 (Figure 4).

Housing 10 is preferably tapered downwardly, and encloses in the upper portion thereof a pair of product treating rollers generally indicated at 17 and 18 respectively. The product is treated as the rollers rotate in opposite directions with the adjacent surfaces of the two rollers moving together and thus carrying the product into the nip 19 formed by the confined areas of the roller surfaces. The product flows into housing 10 through a feeder generally indicated at 20 connected to a conduit 21 provided with a gate valve 21a. Thus the infested product flows through feeder 20 to a point adjacent the treating rollers 17 and 18, and as the rollers rotate, is treated therebetween in a relatively thin layer and falls therefrom into the bottom of housing 10 and thence into outlet chute 16.

Roller 17 (Figure 5) comprises a cylinder 22 which is covered to a suitable radial depth with a facing 23 formed of a tough elastic resilient rubber compound or an odorless synthetic, i. e., an elastomer, the hardness of which may be illustratively on the order of from 40 to 50 durometer. Cylinder or shell 22 is, in turn, fastened to a pair of fan-bladed spiders 24 and 25, the hubs 24a and 25a of which are detachably mounted on the extended rotor shaft 26 of a motor generally indicated at 27. The right-hand end of roller shell 22 is open so that air may flow through the shell to and through passages 28 in the casing of motor 27 and therefrom into a chamber 29 under the suction of an impeller 30 which is housed in chamber 29 and fastened to the motor shaft so as to rotate therewith. Chamber 29 is open to the atmosphere as through ports 31; these ports may be closed by a slidable hood 32 when the machine is not in use to prevent ingress of insects.

The casing of motor 27 has formed therewith or attached thereto a boss 33 through which extends a shaft 34, the shaft being keyed to the boss by a key 35. Shaft 34 extends through the casing side plates 14 and 13, and has coiled about its right-hand end, as viewed in Figure 5, a spring 36, one end of which presses against a thrust bearing 37, and the other end of which presses against a washer and nut, generally indicated at 38. The left-hand end of shaft 34 is headed, as at 39, so that the bias of spring 36 holds face 40 of the casing of motor 27 in tight engagement with side wall 14.

The inner end 27a of the casing of motor 27 is provided with a flat surface 40 from which extends an annular flange 41. Surface 40 is held tightly against the outer surface of casing wall 14 by spring 36, as described, while flange 41 extends into an arcuate slot 42 (Figure 2) formed in side wall 14. End 27a (Figure 5) of the casing of motor 27 is of such configuration and size that for any operating or the idle position of motor 27 (Figure 2) about the axis of shaft 34, slot 42 is completely covered.

Inasmuch as the axial position of roller 18 (Figure 4) is fixed, as will be described hereinafter, it will follow that by reason of the mounting of roller 17 and its driving motor 27, as described, the position of this roller 17 may be varied relative to roller 18, thus to control the treating pressure between the rollers at the nip 19, and also to permit slight but complete separation of the rollers, while the machine is idle; it is desirable that the rollers be completely separated to prevent their elastomer facings from taking a "set" due to a prolonged static deformation. When in operating position, the pressure between the rollers need not exceed compression of the elastomer to less than about 80% of its radial depth. I have found that with the rollers thus adjusted, the pressure within the nip 19 is sufficient to crush and thus completely destroy any insect life present, while not appreciably disintegrating the product particles P (Figure 4A).

As shown in Figures 2 and 5, the motor casing boss 33 has formed thereon or secured thereto a segmental worm wheel 43, the teeth of which mesh with a worm 44 (Figure 2) formed on the end of a shaft 45 rotatably mounted in a radial and double direction thrust bearing 46 mounted on base plate 11. The right-hand end of shaft 45, as viewed in Figure 2, carries a hand wheel 47 which may be manually operated to rotate the shaft and accordingly worm 44 to rock the segmental worm wheel 43 clockwise or counterclockwise, as desired. Thus, counterclockwise rocking of the worm wheel pivots motor 27 counterclockwise to move treating roller 17 (Figure 4) away from roller 18. The casing of motor 27 has fastened thereto a pointer 48 (Figure 2) which registers on a graduated scale 49 secured to and extending from side wall 14 (Figure 5) to visually indicate the setting of treating roller 17 relative to roller 18 (Figure 4). Thus roller 17 may be readily adjusted as desired to a predetermined pressure within nip 19 between rollers 17 and 18, or to slightly but completely separate the two rollers when the machine is idle, as indicated by zero on the scale 49.

As noted hereinabove, the axis of roller 18 is fixed. This roller otherwise is identical in all respects to roller 17, having an elastomer facing 23a coated on shell 22a which is mounted on a shaft 50 by fan-bladed spiders 51, shaft 50 being an extension of the rotor shaft of a motor generally indicated at 52 in Figure 1. Motor 52 is identical in all respects to motor 27 except that it is fastened to side plate 13 by studs and nuts 53. Thus, operation of motor 52 rotates roller 18 (Figure 4) about a fixed axis, and creates a flow of air through the roller shell 22a and about the motor so as to cool both, as described above with respect to roller 17 and its driving motor 27. Inlets for the air flow through rollers 17 and 18 are provided respectively by a circular aperture 104 through side wall 13 (Figure 3) and aperture 105 through an annular plate 107 carried by side wall 14 (Figure 2). Preferably these apertures should not exceed in diameter the inside diameter of roller shell 22. Inlet gates 54 and 55, shown in the drawings in closed positions, are for the purpose of preventing ingress of insects while the machine is idle. These gates are respectively secured to side walls 13 and 14 in any suitable manner so as to be readily openable when the machine is put into operation. For example, as shown in Figure 3, gate 54 may be set in its open or closed position by manipulation of a wing nut 56. To remove rollers 17 and 18 from the machine, hand wheel 47 is turned counterclockwise until annular flange 41 of motor 27 stops against the rear end of arcuate slot 42 (Figure 2). The roller 17 is then in alignment with its clearance hole 106 through side wall 13 as best seen in Figure 4.

To gain access to roller 17, gate 54, shown in closed position in Figure 3, is swung counterclockwise about 180°. Plate 57, held in normal position by screws 58, is then removed. After removal of nut 25b from motor shaft 26 (Figure 5) the roller may now be withdrawn through clearance hole 106 (Figure 4).

Roller 18 is removable by swinging gate 55, shown in closed position in Figure 2, about 180°, then removing annular plate 107 which is held in normal position by screws. After removal of a roller retaining nut at the end of shaft 50 of motor 52, roller 18 may be withdrawn through clearance hole 108 (Figure 2).

By providing individual driving motors for each of rollers 17 and 18 (Figure 4) these motors having like characteristics, each of the rollers is independently driven so that in operation the motor of the higher R. P. M. assumes slightly more than one-half of the total load, as it transmits a small percentage of power through its driven roller by friction drive to the other roller. Thus roller boundary friction is considerably less than if both rollers were driven by a single source of power with power transmitted from one roller to the other by friction drive or by a gear train. Furthermore, by reason of the independent roller drive it is not necessary to hold the elastomer faced rollers to exact values of diameter and hardness. Still further, by the reduction of boundary friction, relatively little heat is generated by such friction, the principal heat generation being caused by internal solid friction in the elastomer due to its deformation during operation of the rollers. The heat thus generated is adequately dissipated by the air drawn through the shells of the rollers by the action of their fan-bladed spiders, and the impellers attached to motors 2 and 52 (Figures 4 and 5).

As noted hereinbefore, in the treatment of a product in a thin layer, it is desirable that the treating capacity of rollers 17 and 18 be adequate to permit commercial and economical use of the machine under the circumstances in which it is installed. Accordingly, it is desirable to rotate the treating rollers 17 and 18 at a relatively high peripheral velocity.

The peripheral velocity of the rollers must be no less than the feeder velocity of the product, and preferably it should be substantially greater to prevent an accumulation or thick layer at the entrance to the nip 19 of the rollers. Any such accumulation increases the thickness of the product layer passing through nip 19 to make for an imperfect treatment. As the treated product emerges from nip 19, it tends to adhere to the surface of the rollers. It is therefore desirable to choose rollers of such diameter and operate them at such peripheral velocity as will cause the emergent product to exert a centrifugal force on the order of 200 times gravity. As the product emerges from between the confined areas of the roller surfaces, or nip 19, it is tangentially discharged primarily by the centrifugal force exerted by the product and also by its lessened adherence to the surfaces of the rollers on account of the stretching of the unconfined elastomer surfaces due to the centrifugal forces they exert. For example, if rollers 17 and 18 are each 5 inches outside diameter and are rotated at 1750 R. P. M., their peripheral velocity is about 2300 feet per minute and the centrifugal forces exerted at their surfaces is over 200 times gravity. It has been found that these dimensions and speeds are well suited for treatment of most any products for which this machine is designed.

When the rollers are in their operating or treating position, as shown in Figure 4, and are rotating at a peripheral velocity on the order of, for example, 2300 feet per minute, winds of approximately the same velocity are generated by the rollers and create extremely turbulent air conditions within housing 10. If these currents were permitted to circulate in the vicinity of the entrance of nip 19 of the rollers, they would blow the flowing product away from the entrance to the nip with resultant imperfect treatment, and breakage of a flaked product, such as rolled oats, that should be fed flatwise and tangentially to roller 18.

To the end of shielding the entrance to nip 19 of the rollers from these air currents, I have provided a pair of tubular idler rollers 59 and 60 (Figure 4) each respectively provided, as shown in Figure 7, with dead shafts 59a and 60a. Each idler roller is provided with two radial ball bearings (not shown) which are mounted, lubricated and sealed in a conventional manner therewithin. These idler rollers are mounted within housing 10 as will now be described.

Studs 63 and 64 are positioned on side walls 14 and 13 respectively (Figure 1) in a plane which approximately coincides with the nip of rollers 17 and 18, and on a line parallel to the axes of the rollers as will be apparent by reference to Figures 1 and 4. Upon these studs identical clamping bars 61 and 62 are pivotally mounted and retained thereon by suitable washers and nuts as shown in Figure 7. As the clamping bars are identical, only bar 62 will be described. At the lower end of the bar, as illustrated in Figure 8, there is provided a conventional split ring clamp with separable jaws 68 and screw 70. Dead shaft end 60a is shown in clamped position by jaw 68. At the upper end of bar 62 (Figure 8) an adjustable pressure clamp generally indicated at 72 has been provided. The slot 73 is the same in width as the diameter of the dead shaft end 59a shown within the slot. A separable adjustable pressure member 74 has an extension 75 which fits the slot sides and at its end conforms to the radius of the shaft. By means of screws 76 the outermost position of the shaft within the slot is regulated and fixed. Idler rollers 59 and 60 are shown positioned and clamped by clamping bars 61 and 62 in Figure 7.

Access to clamping bars 61 and 62 within housing 10 is attained by removal of hand hole covers 77 and 78 (Figure 4) to be more fully described hereinafter. After idler roller 60 has been installed, it engages treating roller 18, and idler roller 59 when installed engages treating roller 17 (Figure 4). The idler rollers are frictionally driven by the treating rollers and the pressure adjustments are made by manipulating righthand threaded screws 76. Turning the screws clockwise (Figure 7) increases the pressure between the driving rollers 17 and 18 and the driven rollers 59 and 60 respectively. The pressure adjustment should be such that just enough pressure is applied to prevent appreciable slip; preferably such final adjustment should be made while the rollers are rotating.

Covers 77 and 78 (Figure 4) are provided with air shields 80 and 82. Cover 77 comprises a top plate 79 for attachment to housing 10 and an integrally formed shield 80 generally U-shaped in cross-section and having its base portion 80a approximately concentric with and closely adjacent to idler 59. The ends of the legs 80b and 80c of shield 80 are preferably immediately adjacent treating roller 17. Cover 78 comprises a plate 81 for attachment to the housing and a shield 82 with its base 82a approximately concentric with and closely adjacent to idler 60, an extension 82b running above the idler, and an extension 82c between the idler and roller 18. The surfaces of portions 82a, 82b and 82c are immediately adjacent to but free from idler 60 and roll 18 to leave a clearance for air passage. Clearance for passage of air also exists between shield 80, idler 59 and roller 17. Portions A and B of shields 80 and 82 are shaped and located within an arc of a few degrees with the axis of studs 63 and 64 as a center and very close, for example 0.005 of an inch, to the surfaces of rolls 59 and 60.

As noted hereinbefore, the untreated product is fed into housing 10 (Figure 4) by means of the feeder 20 having a chute 65 provided with a screen 66 in its upper section. The screen 66 preferably is of metallic bolting cloth with apertures of about 0.005 inch to prevent the escape of insect forms and to permit the escape of excess air. The vibratory motion of feeder chute 65 prevents clogging of the screen. The width of this chute, as shown in Figure 1, is less than the length of the treating rollers, and preferably its width should not exceed about 80% of the axial length of the elastomer faces of the treating rollers. Referring back to Figure 4, it may be seen that the delivery end 65a of the chute lies within housing 10 adjacent the entrance end nip 19, the chute extending upwardly and outwardly from the casing at an angle which is somewhat less than the angle of repose of the product to be treated and approximately tangent to roller 18 adjacent to nip 19. The upper end 65b of chute 65 is fastened to the lower end of conduit 21 by a flexible coupling 65c. Chute 65 is supported on leaf springs 86 and 88 connected to a bracket having forks secured to housing 10 by screws 92.

The portion of chute 65 which extends into housing 10 through a rectangular opening 10a therein passes through suitably slotted plates 94 and 95 (Figure 6). Plate 94 is fixed to chute 65 by brazing or otherwise and plate 95 is separable. These plates ambrace a sheet 96 of flexible material. Sheet 96 is secured between plates 94 and 95 by screws 97 and 98 which extend therethrough. The margin of sheet 96 is fastened to housing 10 by a frame 100, clamped to the housing by screws 99. It may now be seen that the upper and lower ends of feed chute 65 (Figure 4) are resiliently and flexibly supported to permit vibrational reciprocation. An electrically operated vibrating device generally indicated at 103 is mounted on a bracket 103a and interposed between the chute and the supporting bracket 90. Generally speaking, this device comprises an armature 103c and an electromagnet 103b so designed that upon pulsating energization of the electro-magnet, armature 103c imparts vibrational reciprocation to the chute. In this manner the product is fed down chute 65 and continually flows from the end thereof toward the entrance of the nip 19 in an even stream. Feeder 20 is adjusted to give a product feed slightly less than the amount which may be passed through the treatment rollers in the desired thin layer to avoid any accumulation of product at the entrance of the nip 19.

In operation, treatment rollers 17 and 18 rotating at relatively high speeds, naturally create substantial air currents in their directions of rotation but these air currents are blocked from the entrance end of the nip 19 of the rollers 17 and 18 by idler rollers 59 and 60 and shields 80 and 82. More specifically, the currents created by the feed roller 17 impinge against shield 80 and are further blocked by the engagement of idler roller 59 therewith; the counter-directional rotation of idler 59 opposes the flow of these air currents between idlers 59 and shield 80 into the area adjacent the entrance side of the nip 19. The air currents created by feed roller 18 are likewise deflected by idler roller 60 and shield 82. The nip 19 substantially effects an air seal between the untreated product on the entrance side of the nip and the treated product on the discharge side of the nip. Therefore, only a small percentage of the air entrained by the untreated product passes through the nip with the product. Most of the excess of entrained air is discharged to the atmosphere through screen 66, a small amount being discharged between the idler rollers and their air shields to the treated product side of the rollers. Any forms of insect life which may be carried by eddy air currents into the small clearances between idler rollers and their air shields will be destroyed between rolls 59 and 60 and portions A and B of the shields. Obviously if the necessities of design dictate any appreciable clearances between the ends of the rolls and the housing side walls, suitable shielding will be provided to prevent passage of insect life from the untreated product side of the rolls to the treated product side of the rolls.

In operation, the wheel 47 (Figure 2) is adjusted to give the treatment rollers 17 and 18 the position shown in Figure 4. Slidable hoods 32 of the motors and air inlet gates 54 and 55 are set in the open positions. Motors 27 and 52 are then started to drive the treatment rollers in the directions indicated by the arrows in Figure 4, and at the approximate speed above indicated. The feeder 20 is then set in operation and feeds an even stream of the product to be treated directly to the entrance of the nip 19 of the treatment rollers. The product passing through the nip is pressed with sufficient force to destroy all insect life therein without appreciably breaking or otherwise damaging the individual particles. The product then passes down through the housing 10 into the outlet 16. The idler rollers 59 and 60 with accompanying shield members 80 and 82 operate to prevent turbulent air currents in the space adjacent the entrance end of the nip 19, thus to assure an even feed of the product to the nip, and the feeder 20 is adjusted to assure that the product arrives in proper volume.

It may now be seen that I have provided apparatus for and a method of destroying infestation in a flowable product in a manner which attains the several objects hereinbefore set forth in a thoroughly practical and efficient manner.

As many possible embodiments may be made of the mechanical features of the above invention, without departing from the scope of the invention, it is to be understood that all matter hereinbefore set forth or shown in the accompanying drawing is to be interpreted as illustrative and not in a limiting sense.

I claim:

1. In apparatus for effecting the destruction of all insect life in a flowable product composed of individual solid parts, the combination of, a pair of treating rollers covered with a resilient material, said rollers having their peripheries in engagement so that the resilient material at the nip between the rollers is partially compressed to form a pressure area for the treatment of said product at the nip of said rollers, means to feed an even stream of said product to said nip, means for rotating said rollers at a substantial rate of speed so that as said product passes therebetween every individual particle of insect life in said product is crushed in said pressure area, the pressure in said area however being of a value insufficient to crush any substantial part of said product, and means for dissipating heat generated by said rollers.

2. In apparatus for effecting the destruction of all insect life in a flowable product composed of individual solid parts, the combination of, a pair of hollow rollers held in engagement throughout their lengths, the surfaces of said rollers being formed from compressible material, means for pressing said rollers together to provide a compression area at the nip of the rollers, means for rotating said rollers, said compressible material having the characteristic of generating heat during rotation of said rollers, and means for circulating air through the interior of said rollers for cooling purposes.

3. In apparatus for effecting the destruction of all insect life in a flowable product composed of individual solid parts, the combination of, a pair of rollers, means for holding said rollers in engagement under pressure, a chute having its end directed at the nip of said rollers, and means for vibrating said chute to feed an even stream of the product down said chute to the nip of said rollers.

4. In apparatus for effecting the destruction of all insect life in a flowable product composed of individual solid parts, the combination of, a pair of rollers held in compressed engagement, means for feeding the product in an even stream to the nip of said rollers, and means forming a shield around the space adjacent the nip of said rollers where said product is being fed thereto, said means including a pair of rolls each in engagement with one of said rollers and associated with shielding devices.

5. In apparatus for effecting the destruction of insect life in a product, the combination of, a pair of rollers in compressed engagement, means for feeding the product in an even stream to the nip of said rollers, a pair of rolls respectively engaging said rollers adjacent to and on opposite sides of said nip to shield the stream of the product as it enters said nip, and closure means fitting over said rolls to direct the streams of air away from said nip and to assist in shielding the stream of the product.

6. Apparatus as described in claim 5 wherein said closure means includes, a channel member having a channel in which one of said rolls is positioned with the channel surface generally following the contour but spaced from the roll surface with the channel surface spaced from the roll along a line longitudinal of the roll a distance substantially less than the minimum size of insect life which is to be destroyed, whereby particles of insect life are not diverted around said roll.

7. In apparatus for effecting the destruction of insect life in a product, the combination of, product compressing means including a hollow roller having a surface layer portion of an elastomer, means to rotate said roller, and means to pass a stream of cooling air through said roller.

8. In apparatus for destroying insect life in a flowable product, the combination of, a housing having a product inlet and adjacent stationary baffle means, a pair of rollers having elastomer surfaces, means holding said rollers in parallel coacting relationship with a nip through which the product may pass as the rollers are rotated together and with adjacent portions of the rollers deformed by pressure at the nip, counter-rotating baffle means contacting each of said rollers respectively on the opposite sides of said nip adjacent said product inlet and cooperating with said stationary baffle means and said housing to prevent the product which enters said product inlet from passing said rollers without passing into the nip and between the rollers, and a motor-operated feeding assembly to feed the product through said inlet to the nip of the rollers.

9. In apparatus for destroying insect life in a flowable product, the combination of, a housing having a product inlet and adjacent stationary baffle means, a pair of rollers having elastomer surfaces, means holding said rollers in parallel coacting relationship with a nip through which the product may pass as the rollers are rotated together and with adjacent portions of the rollers deformed by pressure at the nip, counter-rotating baffle means contacting each of said rollers respectively on the opposite sides of said nip adjacent said product inlet and cooperating with said stationary baffle means and said housing to prevent the product which enters said product inlet from passing said rollers without passing into the nip and between the rollers, a chute positioned to direct the product through said product inlet and thence into said nip, and means to vibrate said chute whereby the product flows in an even stream to said nip.

10. In apparatus for destroying insect life in a flowable product, the combination of, a housing having a product inlet and adjacent stationary baffle means, a pair of rollers having elastomer surfaces, means holding said rollers in parallel coacting relationship with a nip through which the product may pass as the rollers are rotated together and with adjacent portions of the rollers deformed by pressure at the nip, counter-rotating baffle means contacting each of said rollers respectively on the opposite sides of said nip adjacent said product inlet and cooperating with said stationary baffle means and said housing to prevent the product which enters said product inlet from passing said rollers without passing into the nip and between the rollers, and means to rotate said rollers at a speed sufficient to cause the product which tends to stick to the rollers to be thrown therefrom as the product emerges from the nip.

11. Apparatus as described in claim 10 wherein one of said rollers is rigidly mounted on a shaft, a driving motor having its rotor directly coupled to said shaft, a supporting frame supporting said motor and said shaft and thereby providing support for said roller, means providing a rocking support for said supporting frame whereby the roller and motor may swing to and from the other roller, and means to adjust the position of the roller including a gear segment rigidly fixed to said supporting frame and a worm gear meshing with said gear segment.

12. Apparatus as described in claim 10 wherein said rollers are provided with air passageways therethrough, and means to direct cooling air through said passageways.

13. Apparatus as described in claim 10 which includes two motors directly connected respectively to drive said rollers, and means to move one of said rollers to and from the other thereby to adjust the pressure at the nip.

FRANKLIN S. SMITH.

REFERENCES CITED

The following references are of record in the file of this patent:

UNITED STATES PATENTS

| Number | Name | Date |
| --- | --- | --- |
| 28,071 | Fritz | May 1, 1860 |
| 121,197 | Richardson | Nov. 21, 1871 |
| 1,609,188 | Pettit | Nov. 30, 1926 |
| 1,722,943 | Pettit | July 30, 1929 |
| 2,139,944 | Fiscel | Dec. 13, 1938 |
| 2,205,177 | Schlegel | June 18, 1940 |
| 2,302,566 | Minkow | Nov. 17, 1942 |